(12) United States Patent
Chen

(10) Patent No.: US 7,478,936 B2
(45) Date of Patent: Jan. 20, 2009

(54) TUBULAR LAMP DEVICE USING LED

(75) Inventor: Cheng-Tang Chen, Sansia Township, Taipei County (TW)

(73) Assignee: Eiso Enterprise Co., Ltd., Taoyuan County (TW)

( * ) Notice: Subject to any disclaimer, the term of this patent is extended or adjusted under 35 U.S.C. 154(b) by 71 days.

(21) Appl. No.: 11/739,106

(22) Filed: Apr. 24, 2007

(65) Prior Publication Data
US 2008/0266847 A1    Oct. 30, 2008

(51) Int. Cl.
*F21V 7/04* (2006.01)
(52) U.S. Cl. .................. 362/555; 362/558; 362/582
(58) Field of Classification Search .............. 362/551, 362/555, 217, 558, 582, 223, 307, 308, 310, 362/339
See application file for complete search history.

(56) References Cited
U.S. PATENT DOCUMENTS

| | | | | |
|---|---|---|---|---|
| 6,550,952 B1* | 4/2003 | Hulse et al. | ................. | 362/555 |
| 6,637,924 B2* | 10/2003 | Pelka et al. | ................. | 362/555 |
| 6,832,849 B2* | 12/2004 | Yoneda et al. | ............. | 362/551 |
| 6,851,816 B2* | 2/2005 | Wu et al. | ................... | 362/602 |
| 6,966,664 B2* | 11/2005 | Wu | .......................... | 362/610 |
| 7,063,450 B2* | 6/2006 | Ehara et al. | ................. | 362/621 |
| 2007/0195548 A1* | 8/2007 | Wang | ........................ | 362/555 |

\* cited by examiner

*Primary Examiner*—Thomas M Sember
(74) *Attorney, Agent, or Firm*—Leong C. Lei

(57) ABSTRACT

The tubular lamp device contains a passive and transparent lamp tube whose two ends are plugged into a pair of socket members, respectively. The lamp tube has an axial strip along the circumference coated with a reflective film. The socket member contains a tubular element which receives an end of the lamp tube. Inside the tubular element, a LED element is housed in a hole of a solid lens element which directs the light beams of the LED element towards the lamp tube. The light beams are then reflected by the reflective film to create a large area of illumination as the light beams propagate through the lamp tube.

5 Claims, 5 Drawing Sheets

TUBULAR LAMP DEVICE USING LED

TECHNICAL FIELD OF THE INVENTION

The present invention generally relates to lamp devices, and more particularly to a tubular lamp device using light emitting diodes as light source.

DESCRIPTION OF THE PRIOR ART

Fluorescent lamp tubes are, besides light bulbs, the most widely used lighting devices. However, as the concerns for environment protection and energy conservation are increased among people, the use of fluorescent lamp tubes is constantly challenged. For quite a few nations, it is already legalized that a fluorescent lamp tube must be recycled following specific procedures and channels. Despite these rules and regulations, the fluorescent agent contained in the lamp tubes and the glass lamp tubes themselves present significant difficulties and hazards in recycle. On the other hand, the fluorescent lamp tubes, despite their long history of presence and continuous improvement, still offer a less satisfactory efficiency both in terms of light generation and heat dissipation.

On the other hand, recent development in the brightness and longevity of light emitting diodes (LEDs) has present people another alternative. Compared to the light bulbs and fluorescent lamp tubes, LEDs consume very little power but can produce even better lighting and much lower heat dissipation. Therefore, some lamp devices using LEDs are already commercially available.

SUMMARY OF THE INVENTION

Accordingly, the present invention provides a tubular lamp device using LEDs as light source.

The tubular lamp device contains a passive and transparent lamp tube whose two ends are plugged into a pair of socket members, respectively. The lamp tube has an axial strip along the circumference coated with a reflective film. The socket member contains a tubular element which receives an end of the lamp tube. Inside the tubular element, a LED element is housed in a hole a solid lens element which directs the light beams of the LED element towards the lamp tube. The light beams are then reflected by the reflective film to create a large area of illumination s the light beams propagate through the lamp tube.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth n the appended claims.

Figure 1:
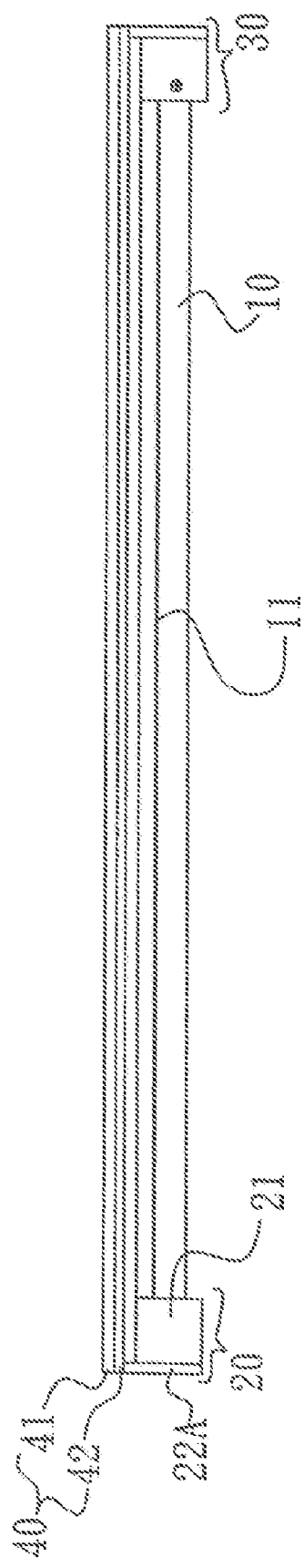
FIG. 1 is a schematic profile diagram showing a tubular lamp device according to an embodiment of the present invention.
Figure 2:
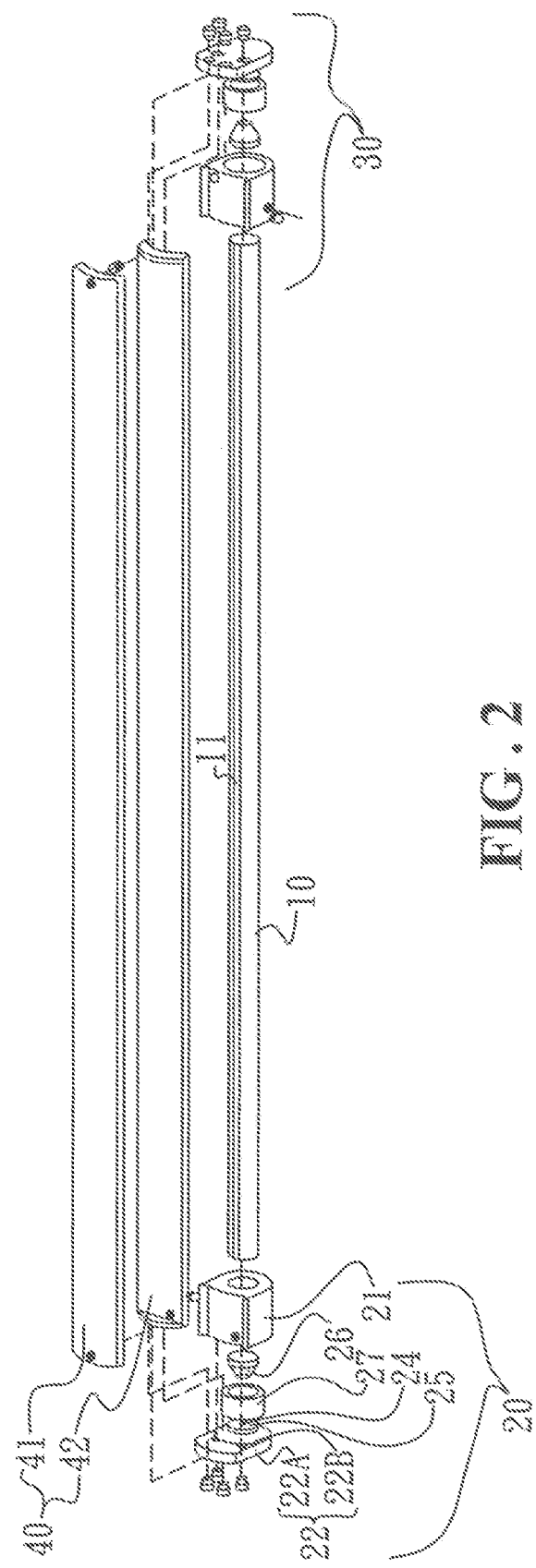
FIG. 2 is a schematic exploded diagram showing the various components of the tubular lamp device of FIG. 1.

As shown in FIGS. 1 and 2, a tubular lamp device according to an embodiment of the present invention contains a lamp tube 10 whose two ends are plugged into a pair of socket members 20 and 30, respectively, which in turn are mounted to the bottom of an elongated shade member 40. As such, the lamp tube 10 is held below and substantially parallel to the shade member 40. The lamp tube 10 is a transparent tubular element, preferably made of a plastic material, having an axial strip along the circumference adjacent to the shade member 40. The axial strip is coated with a reflective film 11. The shade member 40 contains a top plate 41 and a bottom plate 42 stacked to the bottom of the top plate 41. The socket members 20 and 30 are then bolted to the bottom of the bottom plate 42.

Figure 3:
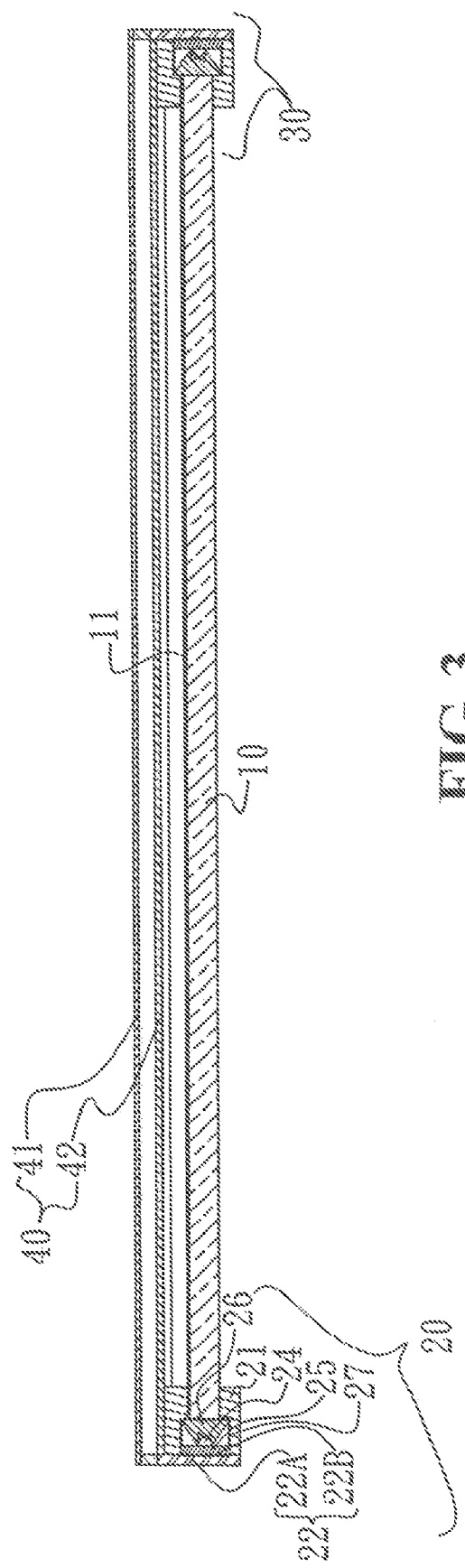
FIG. 3 is a schematic sectional diagram showing the tubular lamp device of FIG. 1.
Figure 4:
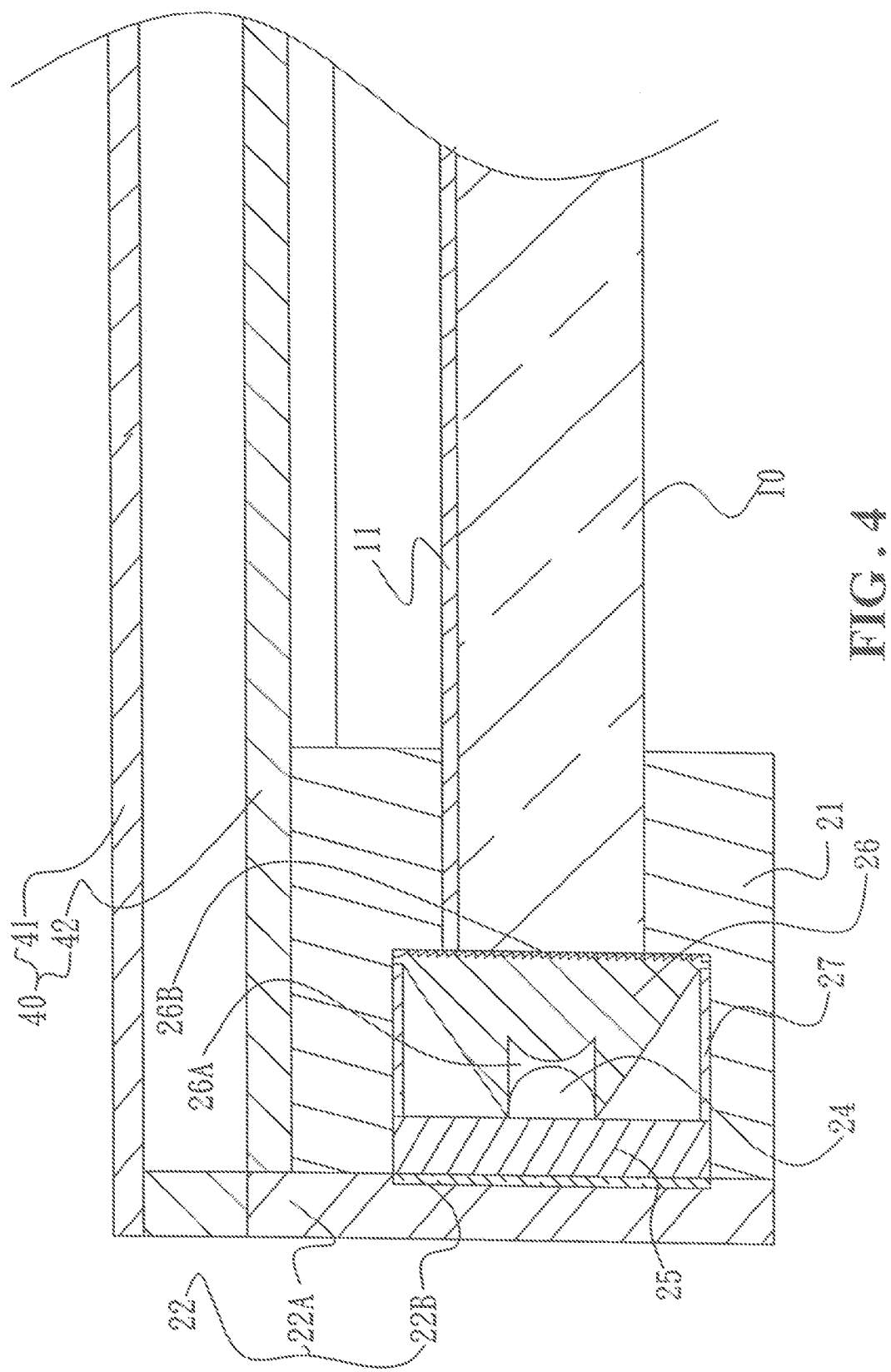
FIG. 4 is a schematic sectional diagram showing a socket member of the tubular lamp device of FIG. 1.

The two socket members 20 and 30 are identical. Using the socket member 20 as example, the structure of the socket members 20 is illustrated in FIGS. 3 and 4. As shown, the socket member 20 contains a base element 22 and a tubular element 21. A first end of the tubular element 21 is joined to and sealed by a major surface of the base element 22. A second end of the tubular element 21 receives an end of the lamp tube 10. The base element 22 contains a plate body 22A and, on the major surface, a copper foil 22B is attached for heat dissipation. Inside the tubular element 21, the lamp tube 10 is directly attached to a second side of a solid lens element 26 which is surrounded by a ring 27. Also inside the tubular element 21, a first side of the lends element 26 is attached to a second side of a substrate 25. A first side of the substrate 25 is attached to the copper foil 22B. A second side of the substrate 25 has a LED element 24 and the first side of the lens element 26 has a hole 26A accommodating the LED element 24 entirely. The bottom of the hole 26A is bulged towards the LED element 24 so that the lends element 26 functions like a refractive lens. The LED element 24 is positioned such that its light beams is directed towards the second side of the lens element 26 (and, thereby, the lamp tube 10), which has a sawtooth-like patter 26B to further scatter the light beams from the LED element 24. The tubular element 21 is preferably made of a metallic material such as aluminum to further confine the light beams towards to the lamp tube 10. Please note that, for simplicity, the connection of the LED element 24 to an external power source is omitted here.

Figure 5:
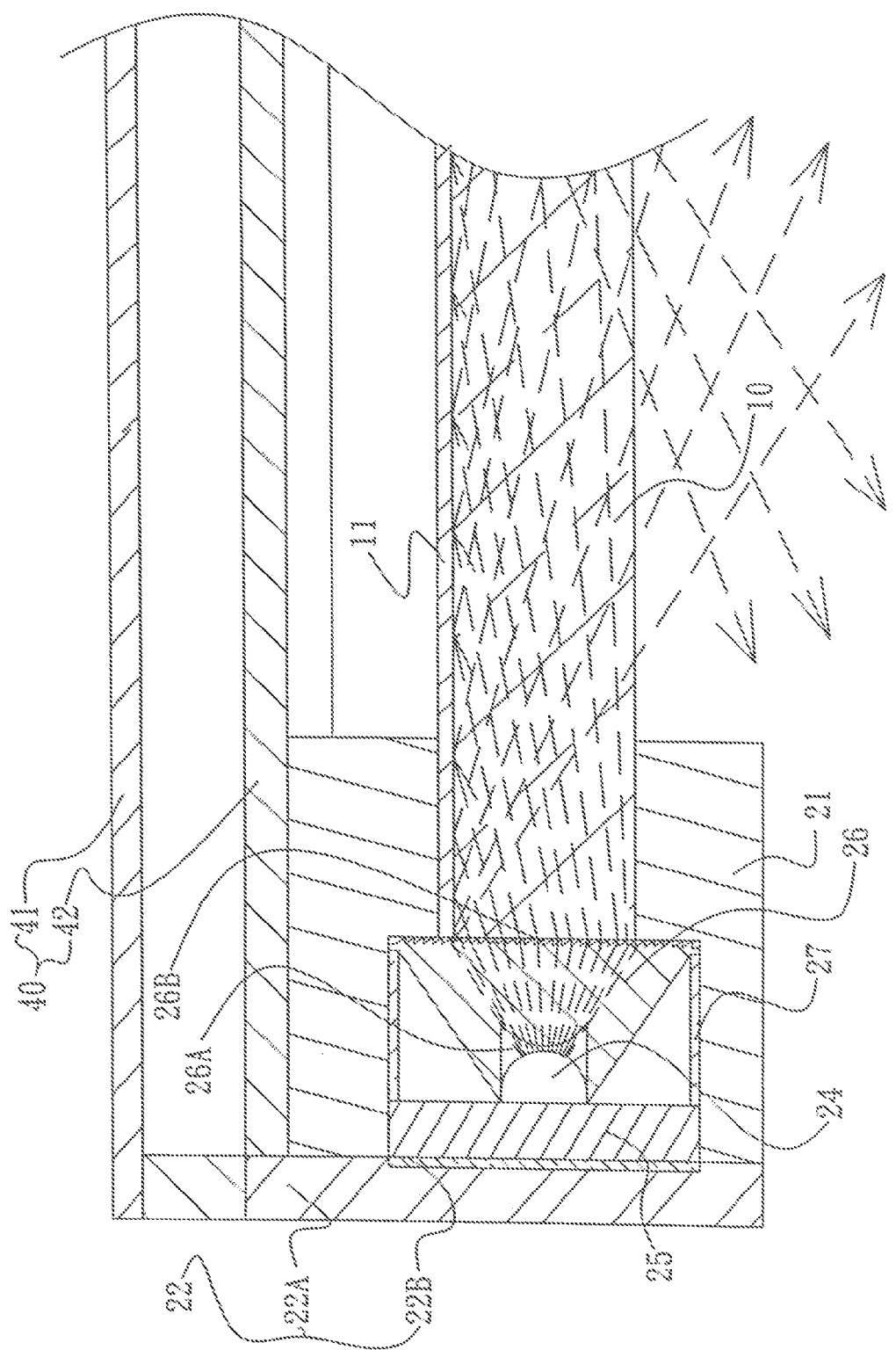
FIG. 5 is a schematic sectional diagram showing trajectories of the light beams emanated from a LED element of the tubular lamp device of FIG. 1.

As shown in FIG. 5, when a DC voltage is applied to the LED element 24 to turn it on, the light beams (shown as dashed lines) from the LED element 24 entering the lens element 26 are refracted to shoot into the lamp tube 10. The light beams are then reflected by the reflective film 11 downward to create a large area of illumination as the light beams propagate through the lamp tube 10.

The advantages of the present invention are as follows. First, the lamp tube 10 is only a passive device and therefore can endure an extended period of usage without replacement. Secondly, if the lamp tube 10 is made of a transparent plastic material, it can be recycled much more easily and safely. In addition, the LED element 24 has extremely low power consumption. A 4.5 DC voltage applied to the LED element 24 is able to create a satisfactory light coverage, which is much more environment-friendly than the fluorescent lamp tube which requires 110 AC voltage. The LED element 24 also creates less amount of heat than the fluorescent lamp.

It will be understood that each of the elements described above, or two or more together may also find a useful application in other types of methods differing from the type described above.

While certain novel features of this invention have been shown and described and are pointed out in the annexed claim, it is not intended to be limited to the details above, since ti will be understood that various omissions, modifications, substitutions and changes in the forms and details of the device illustrated and in its operation can be made by those skilled in the art without departing in any way from the spirit of the present invention.

I claim:

1. A tubular lamp device, comprising:
   an elongated shade member;
   two socket members mounted to a bottom of said shade member, each of said socket members having a base element and a tubular element, a first end of said tubular element joined to and sealed by a major surface of said base element; and
   a transparent lamp tube whose two ends are plugged into a second end of said tubular elements of said socket members, respectively, so that said lamp tube is held below and substantially parallel to said shade member, said lamp tube having an axial strip along its circumference adjacent to said shade member, said axial strip being coated with a reflective film;
   wherein, inside said tubular element, said lamp tube is directly attached to a second side of a solid lens element; a first side of said lens element is attached to a second side of a substrate inside said tubular element; a first side of said substrate is attached to one of said major surfaces of said base element; a second side of said substrate has a LED element; said first side of said lens element has a hole accommodating said LED element entirely; a bottom of said hole is bulged towards said LED element; said LED element is positioned such that its light beams is directed into said lens element and refracted to shoot into said lamp tube; and the light beams are then reflected by said reflective film downward to create an area of illumination as the light beams propagate through said lamp tube.

2. The tubular lamp device according to claim 1, wherein said shade member contains a top plate and a bottom plate, said bottom plate being stacked to a bottom of said top plate; and said socket members are bolted to the bottom of said bottom plate.

3. The tubular lamp device according to claim 1, wherein said tubular element is made of aluminum.

4. The tubular lamp device according to claim 1, wherein said lamp tube is made of a plastic material.

5. The tubular lamp device according to claim 1, wherein said base element contains a plate body, one of said major surfaces has an attached copper foil; and said substrate is joined to said copper foil.

* * * * *